(12) United States Patent
Chang et al.

(10) Patent No.: US 9,306,461 B2
(45) Date of Patent: Apr. 5, 2016

(54) LED DRIVER WITH SMALL OUTPUT RIPPLE WITHOUT REQUIRING A HIGH-VOLTAGE PRIMARY-SIDE ELECTROLYTIC CAPACITOR

(71) Applicant: Hong Kong Applied Science & Technology Research Institute Company Limited, Hong Kong (HK)

(72) Inventors: Po Wah Chang, Hong Kong (HK); Chik Wai (David) Ng, Hong Kong (HK); Hing Kit Kwan, Hong Kong (HK); Wai Kit (Victor) So, Hong Kong (HK); Shaobin Wu, Hong Kong (HK); Kwok Kuen (David) Kwong, Davis, CA (US)

(73) Assignee: Hong Kong Applied Science and Technology Research Institute Company, Limited, Hong Kong (HK)

( * ) Notice: Subject to any disclaimer, the term of this patent is extended or adjusted under 35 U.S.C. 154(b) by 97 days.

(21) Appl. No.: 14/315,647

(22) Filed: Jun. 26, 2014

(65) Prior Publication Data

US 2015/0381054 A1 Dec. 31, 2015

(51) Int. Cl.
*H02M 3/335* (2006.01)
*H05B 33/08* (2006.01)
*H02M 1/42* (2007.01)

(52) U.S. Cl.
CPC ............ *H02M 3/33507* (2013.01); *H02M 1/42* (2013.01); *H05B 33/0815* (2013.01)

(58) Field of Classification Search
CPC ........... H05B 33/0815; H05B 33/0818; H05B 33/0803; H05B 33/0842; H05B 37/02; H05B 41/232; H05B 41/2828; H02M 1/44; H02M 1/425; H02M 1/4225; H02M 3/33507; H02M 1/42; H02M 1/4258; G05F 1/575; Y02B 20/346; Y02B 20/347; Y02B 20/342; Y02B 70/1433; Y02B 70/1475
USPC ......... 315/247, 291, 307, 278, 224, 312, 192, 315/203, 206; 323/277, 280–282; 363/21.01, 21.08, 21.09, 21.12, 21.15, 363/21.16, 45, 46
See application file for complete search history.

(56) References Cited

U.S. PATENT DOCUMENTS 5,991,171 A * 11/1999 Cheng ............... H02M 3/33507
363/21.03
6,944,034 B1 * 9/2005 Shteynberg ......... H02M 1/4258
323/282

(Continued)

OTHER PUBLICATIONS

Fairchild Semiconductor, FL7732 Data Sheet, Apr. 2012, pp. 1-13.

(Continued)

*Primary Examiner* — Haissa Philogene
(74) *Attorney, Agent, or Firm* — Stuart T. Auvinen; gPatent LLC

(57) ABSTRACT

A power converter reduces output ripple without using an electrolytic primary-side capacitor that can reduce product lifetime. Primary-Side Regulation (PSR) using an auxiliary winding provides a regulated secondary voltage with some low-frequency ripple on a secondary winding of a transformer. A smaller secondary capacitor that is not an electrolytic capacitor filters the output of the secondary side. A bang-bang controller controls the secondary side current to reduce current ripple despite voltage ripple. The bang-bang controller has a series resistor and inductor in series with a load such as an LED. A voltage drop across the series resistor increases when a switch turns on. This increasing voltage drop toggles the switch off once an upper limit voltage is reached. The voltage drop then decreases as inductor current is shunted by a diode, until the voltage drop reaches a lower limit voltage and the switch toggles on again.

20 Claims, 6 Drawing Sheets

(56) References Cited

U.S. PATENT DOCUMENTS

| | | | |
|---|---|---|---|
| 6,952,355 B2* | 10/2005 | Riggio | H02M 1/4225 363/21.15 |
| 7,511,973 B2* | 3/2009 | Kesterson | H02M 3/33507 363/21.01 |
| 8,300,431 B2 | 10/2012 | Ng et al. | |
| 8,310,172 B2* | 11/2012 | Negrete | H05B 33/0815 315/209 R |
| 8,633,613 B2* | 1/2014 | Wanner | H02M 3/1588 307/31 |
| 2008/0018261 A1* | 1/2008 | Kastner | F21V 23/00 315/192 |
| 2013/0294118 A1 | 11/2013 | So et al. | |

OTHER PUBLICATIONS

ON Semiconductor, NCL30000 Data Sheet, Sep. 2012, pp. 1-22.
XLSemi, XL5003 Data Sheet, Rev 3.1, Nov. 2012 ?, pp. 1-8.

* cited by examiner

LED DRIVER WITH SMALL OUTPUT RIPPLE WITHOUT REQUIRING A HIGH-VOLTAGE PRIMARY-SIDE ELECTROLYTIC CAPACITOR

FIELD OF THE INVENTION

This invention relates to high-power driver circuits, and more particularly to reduced output-current ripple using a bang-bang controller.

BACKGROUND OF THE INVENTION

A high current is required for certain applications. Energy conservation has increased the demand for Light-Emitting Diode (LED) lighting to replace traditional lamps. A very high current such as half of an amp may need to be driven through one or more LED's to provide the desired luminosity. The power source may be an Alternating-Current (A.C.) source such as provided by an electric utility or portable generator or alternator on a moving vehicle.

A rectifier such as a full diode bridge and a transformer may be used to convert power and drive the LED or other load. A residual of the A.C. input may appear on the output as a variation or ripple that may match the A.C. frequency, such as 120 or 100 Hz. This ripple may be reduced by using a capacitor across the diode bridge. However, when large currents are used to drive loads such as LED's, this capacitor must be very large. However, having a large capacitor on the primary side may reduce the power factor, since the primary-side rectified AC waveform is distorted and not similar to the input voltage to the diode bridge.

An electrolytic capacitor is often used for reducing ripple. Since the primary side of the transformer typically has a high voltage, a high-voltage electrolytic capacitor is needed. However, these high-voltage electrolytic capacitors are prone to failure. A short or leakage in the high-voltage electrolytic capacitor used to reduce ripple may cause the LED driver circuit to fail, reducing the rated lifetime of the LED lighting product. Although the LED itself has a high lifetime, the high-voltage electrolytic capacitor on the primary side of the LED driver circuit may reduce the lifetime of the overall LED lighting product. Thus removing the high-voltage electrolytic capacitor is desired. Reducing ripple using a circuit that uses smaller, low-voltage capacitors is desirable. Thus if the driver circuit can be modified to reduce output ripple significantly, without a high voltage electrolytic capacitor on primary side, the lifetime of the LED lighting product will be increased.

FIG. 1 is a schematic diagram of a prior-art converter with a high-voltage primary-side capacitor. AC supply 15 produces an alternating-current that is applied to a full-wave rectifier bridge of diodes 11. The output of the bridge of diodes 11 is connected to input voltage VIN and ground. Primary capacitor 17 acts to store current and smooth out variations such as ripple in VIN. For example, a 240-volt AC supply can produce a peak 370-volt signal for VIN. AC supply 15 could be a wall electrical output that is connected to a domestic AC supply or to an AC generator.

Transformer 10 can have an iron core to enhanced mutual inductance between primary windings that are connected between input voltage VIN and ground, and secondary windings connected to secondary diode 26.

The primary loop of transformer 10 has primary current flowing from primary capacitor 17 to VIN, then through the primary windings of transformer 10 to ground. A resistor or switched transistor such as a MOSFET (not shown) may also be present in this primary loop.

The secondary loop of transformer 10 has secondary current IS flowing from the secondary windings of transformer 10 through forward-biased secondary diode 26 to output voltage VO. Secondary capacitor 28 stores charge to provide a more constant current through load resistor 25 when secondary current IS is not flowing from transformer 10.

Primary capacitor 17 is usually bulky in size for high-current drivers such as LED drivers. For example, primary capacitor 17 may have a capacitance value of 100 uF (450V). High voltage electrolytic capacitors are bulky compared with low voltage capacitors. Traditionally, the size of a 22 uF high voltage electrolytic capacitor is about the same size as a 35V, 470 uF capacitor. Typically, primary capacitor 17 is a 22 uF capacitance for a 10 W LED driver. These values require large bulky capacitors such as an electrolytic capacitor. Also, since the primary side has a high voltage, such as 240 volts, a high-voltage capacitor is needed to withstand the high voltage across its dielectric. These high-voltage electrolytic capacitors are not only expensive, but also failure prone. Leakage in the high-voltage electrolytic capacitors can limit the rated lifetime of the overall LED circuit.

Opto-couplers are sometimes used in LED driver circuits. However, the opto-coupler may degrade over time, such as by dirt accumulation that blocks light. Thus a LED driver circuit that does not use an opto-isolator is also desired.

Control circuitry is needed to produce a constant DC output current. A transformer may be used to isolate the primary side connected to the AC power from the DC output side for enhanced safety. Rather than connect the control circuitry to the secondary (DC) side of the transformer, the control circuitry can connect to the primary (AC) side. Heat dissipation, form factors, component counts, and costs can be reduced with primary-side sensing regulators (PSR) and control due to the higher efficiency and elimination of the opto-isolator.

FIG. 2 shows a converter without a high-voltage primary capacitor. A power converter that reduces ripple while reducing or eliminating the primary-side high-voltage electrolytic capacitor is desirable.

DETAILED DESCRIPTION

The present invention relates to an improvement in power drivers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 3:
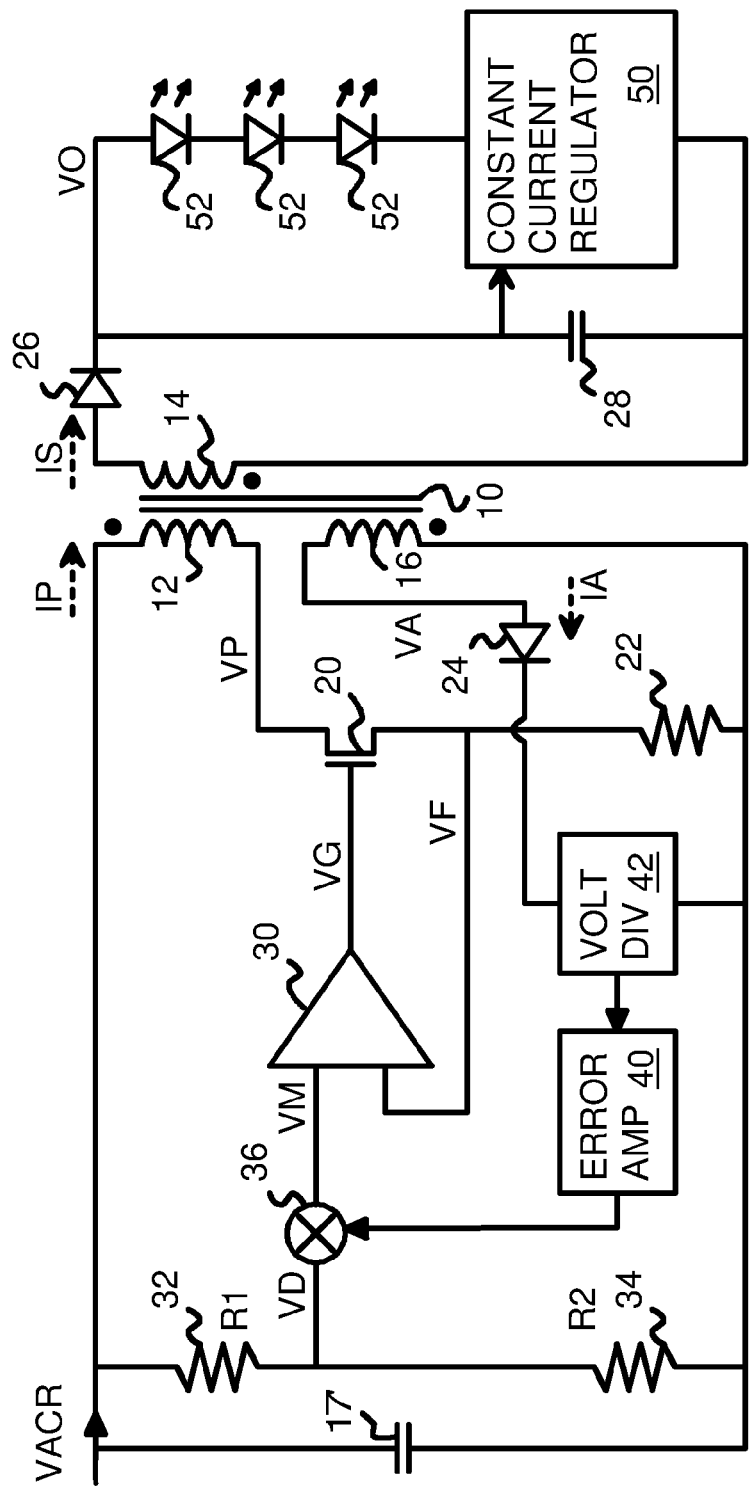
FIG. 3 shows a diagram of a power converter that switches the primary current.

FIG. 3 shows a diagram of a power converter that switches the primary current. An AC supply produces an alternating-current that is applied to a full-wave rectifier bridge of diodes (not shown) to generate a rectified AC input voltage VACR.

Transformer 10 can have an iron core to enhanced mutual inductance between primary windings 12 that are connected between input voltage VACR and drain voltage VP, and secondary windings 14 connected to secondary diode 26. Third windings 16 in transformer 10 connect to auxiliary voltage VA. The direction of the windings in transformer 10, as shown by the dots, is such that an abrupt halt to a downward primary current IP causes a secondary current IS to flow upward due to mutual inductance in transformer 10. Likewise, an abrupt change in primary current IP causes an auxiliary current to flow through third windings 16 in transformer 10 to voltage VA and then through diode 24 to voltage divider 42.

The primary loop of transformer 10 has primary current IP flowing from VACR, through primary windings 12 of transformer 10 to VP, and then through switch 20 to primary sensing voltage VF, and finally through primary sensing resistor 22 to ground. The primary current IP is measured as the current through primary sensing resistor 2, which produces a primary sensing voltage VF that is equal to the I-R drop, or VF=IP*RS, where RS is the resistance of primary sensing resistor 22.

The secondary loop of transformer 10 has secondary current IS flowing from secondary windings 14 of transformer 10 through forward-biased secondary diode 26 to output voltage VO. Secondary capacitor 28 stores charge to provide a more constant current through a load on VO, such as LED's 52, when secondary current IS is not flowing from transformer 10.

The third loop of transformer 10 has auxiliary current flowing from third windings 16 of transformer 10 to voltage VA and then through diode 24 to voltage divider 42, which generates a sensing voltage that is amplified by error amp 40 and applied as an input to multiplier 36.

Input resistors 32, 34 form an input voltage divider that divide input voltage VACR to generate divided voltage VD, which is applied to multiplier 36. Multiplier 36 multiplies the divided voltage VD with the error voltage from error amp 40 to generate voltage VM. The sensitivity of this comparison by multiplier 36 can be adjusted by adjusting the values of components in voltage divider 42, error amp 40, and input resistors 32, 34.

Voltage VM from multiplier 26 is input to comparator 30, which compares voltage VM to primary sensing voltage VF. Differences between VM and VF cause gate voltage VG to be adjusted by comparator 30 to turn switch 20 on and off, or to adjust the primary current IP flowing through switch 20. Thus a feedback from the auxiliary voltage VA from third windings 16 generates an error signal that adjusts the primary current by switching primary current using switch 20.

Switch 20 is an n-channel transistor that has a gate controlled by gate voltage VG. The primary current through transformer 10 is abruptly cut off when gate voltage VG is switched from high to low, causing switch 20 to turn off. The primary current slowly increases when gate voltage VG is switched from low to high, causing switch 20 to turn on. The primary current through primary windings 12 increases slowly when switch 20 is turned on since the inductance of transformer 10 acts as a resistance to sudden changes in current.

The secondary voltage generated by secondary windings 14 is thus regulated by the primary side of transformer 10. This is known as Primary-Side-Regulation (PSR) and has a lower latency than regulation using sensing from the secondary side.

Figure 1:
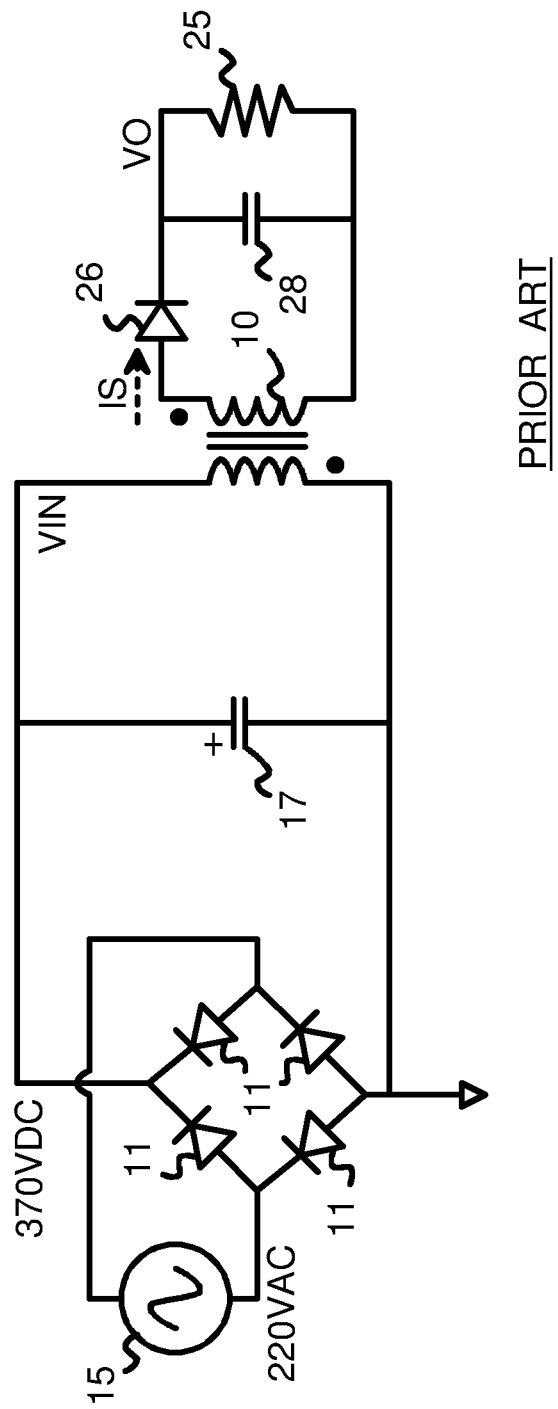
FIG. 1 is a schematic diagram of a prior-art converter with a high-voltage primary-side capacitor.
Figure 2:
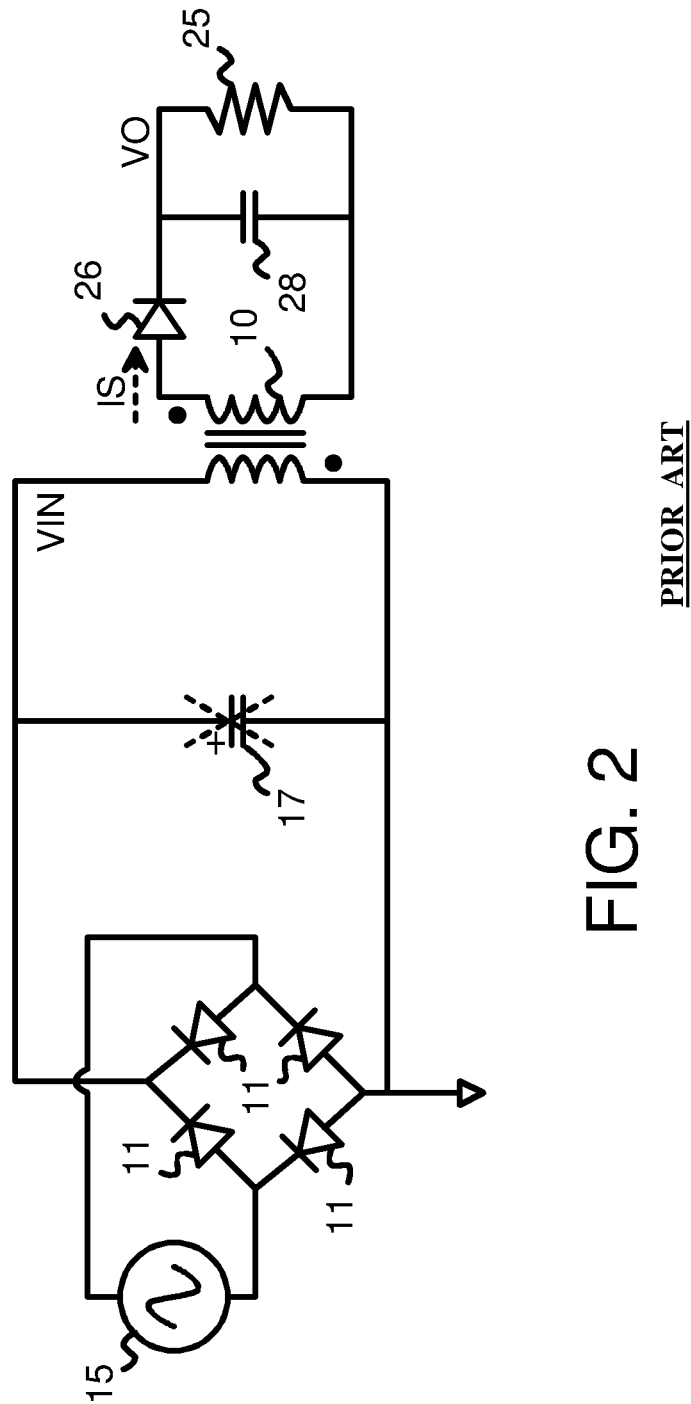
FIG. 2 shows a converter without a high-voltage primary capacitor.

There is no high-voltage electrolytic primary capacitor 17 (FIG. 2) in this embodiment. Instead, a high-voltage ceramic capacitor may be used as primary capacitor 17', since high-voltage ceramic capacitors have a higher lifetime than high-voltage electrolytic capacitors. However, large capacitances are not available for high-voltage ceramic capacitors. A smaller high-voltage primary capacitor 17', such as 100 nF, is only useful for filtering.

To compensate for the increased ripple caused by eliminating primary capacitor 17 or just having a lower-capacitance such as 100 nF rather than 22 uF for primary capacitor 17', constant current regulator 50 is inserted into the path of the output current that flows through LED's 52. Constant current regulator 50 controls the output current using active circuit techniques rather that by passively storing charge as does secondary capacitor 28. Using the active circuitry of constant current regulator 50 allows for eliminating primary capacitor 17 or using a drastically smaller capacitance value of primary capacitor 17' since constant current regulator 50 can compensate for ripple the secondary current.

A very large ripple can pass through transformer 10 from the primary side to the secondary side since the secondary side can reduce ripple using constant current regulator 50. Secondary capacitor 28 can be a low-voltage capacitor since the primary-side high voltage is stepped down to a low voltage by transformer 10.

Figure 4:
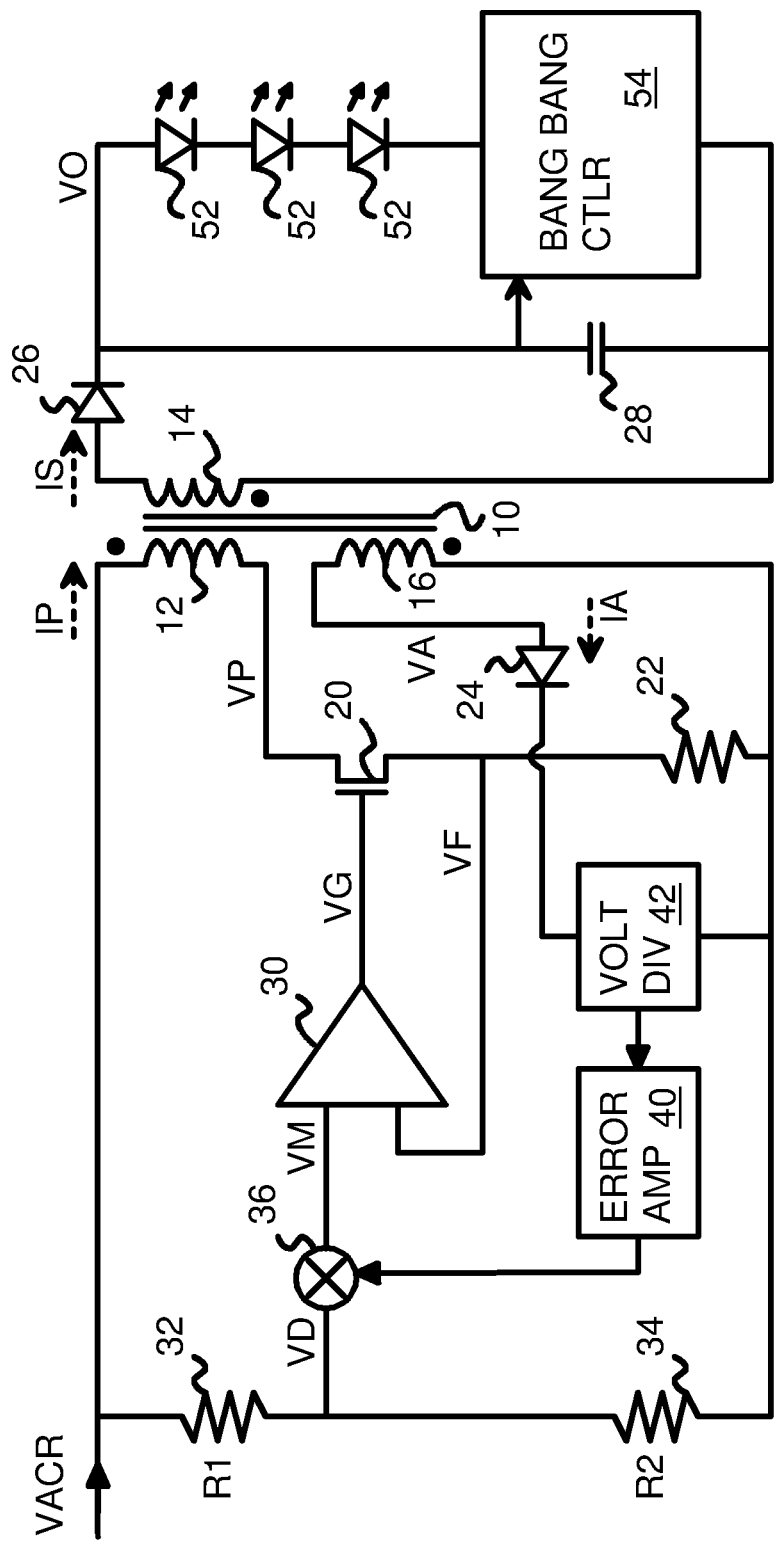
FIG. 4 shows a power converter using a bang-bang controller to control the output current to compensate for ripple.

FIG. 4 shows a power converter using a bang-bang controller to control the output current to compensate for ripple. Constant current regulator 50 of FIG. 3 is implemented by bang-bang controller 54.

The secondary voltage from secondary windings 14 is determined by the ratio of the number of turns in secondary windings 14 to the number of turns in primary windings 12. This secondary voltage varies due to the time-varying waveform of input voltage VACR applied to transformer 10. Secondary capacitor 28 can store a limited amount of charge. Since there is no large-capacitance high-voltage primary-side capacitor, there is a lot of ripple passed through transformer 10. Thus ripple remains on output voltage VO after secondary diode 26. This ripple causes a varying current through LED's 52, which may be visible as flickering or wavering lighting, which is undesirable.

Bang-bang controller 54 regulates the output current through LED's 52 using an upper limit and a lower limit. Output current is switched rapidly on and off when upper and lower limits are hit, perhaps explaining the name "bang-bang". The active circuitry in bang-bang controller 54 reduced output current variation to be within the upper and lower limits, negating the effect of increased ripple across a smaller secondary capacitor 28.

Figure 5:
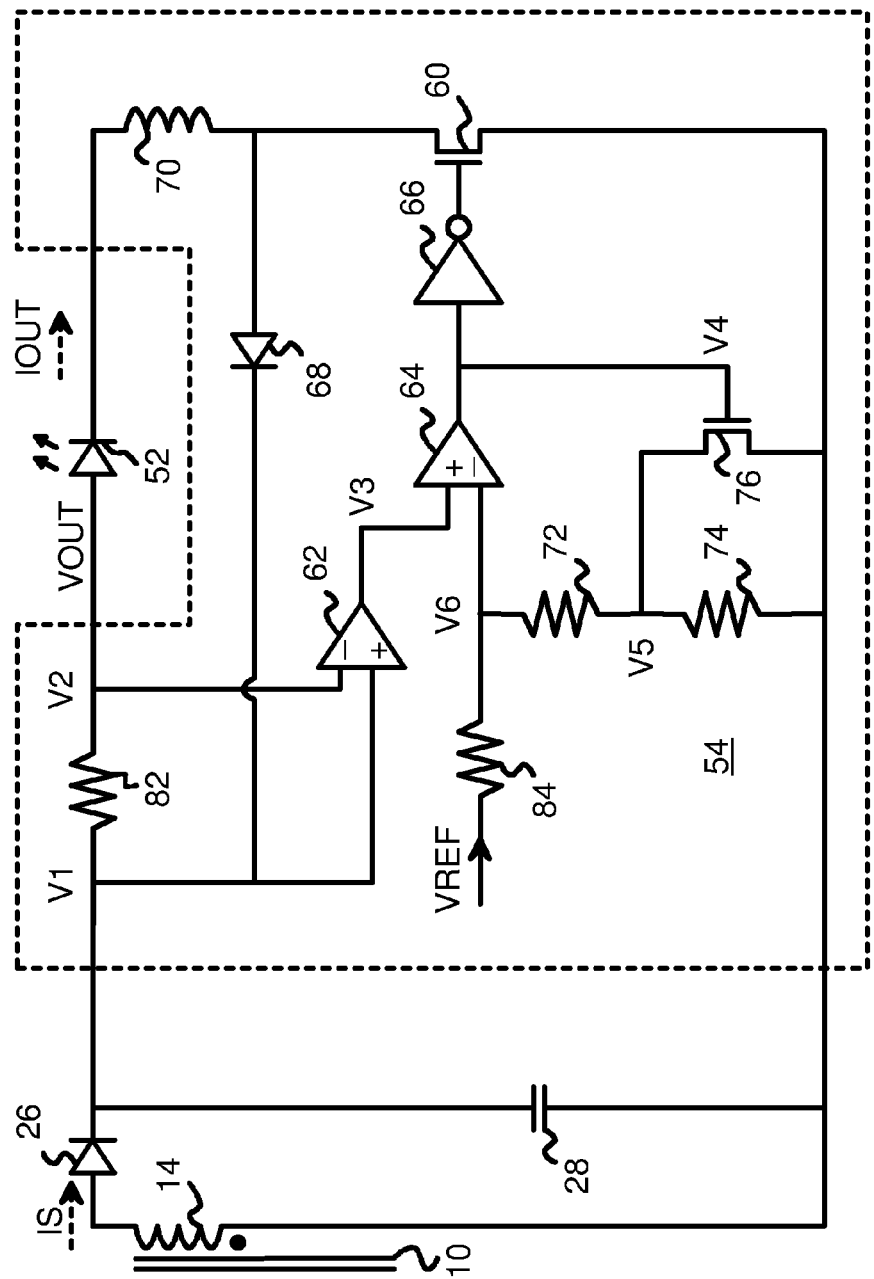
FIG. 5 is a diagram of a bang-bang controller to reduce output current ripple through and LED being driven.

FIG. 5 is a diagram of a bang-bang controller to reduce output current ripple through and LED being driven. Secondary current IS generated by secondary windings 14 in transformer 10 is rectified by secondary diode 26 and filtered by secondary capacitor 28. However, secondary capacitor 28 is a capacitor with a relatively smaller capacitance, such as 200 µF. Secondary capacitor 28 has an insufficient capacitance to eliminate ripple, so voltage V1 has a significant ripple. Voltage V1 across secondary capacitor 28 is input to bang-bang controller 54.

Series resistor 82 generates a voltage difference between V1 and V2 as the secondary current passes through series resistor 82. Voltages V1 and V2 are input to unity gain current sense amplifier 62, which outputs V3 to comparator 64. The output of comparator 64 is V4 which is toggled on and off. Inverter 66 then drives the gate of switch 60 with the inverse of V4. Switch 60 is toggled on and off as V4 toggles.

A toggling reference voltage V6 is applied to the inverting input of comparator 64. A reference voltage VREF is divided by resistor 84 and resistors 72, 74 in series to generate V6. Feedback transistor 76 receives the toggling V4 on its gate, and turns on and off, causing resistor 74 to be bypassed when feedback transistor 76 is on. Thus the toggling reference voltage V6 toggles between an upper value and a lower value. The upper reference voltage V6-H is VREF*(R72+R74)/(R82+R72+R74), where R82 is the resistance of resistor 82, R72 is the resistance of resistor 72, and R74 is the resistance of resistor 74. The lower reference voltage V6-L is VREF*(R72)/(R82+R72).

Comparator 64 compares V3 to the upper reference voltage V6-H when feedback transistor 76 is off, and to the lower reference voltage V6-L when feedback transistor 76 is on. When feedback transistor 76 is on, resistor 74 is bypassed and the reference voltage V6 is lowered.

When switch 60 is switched on, the current through inductor 70, LED 52, and series resistor 82 gradually increases. Quick changes in current are limited by inductor 70, so when switch 60 is first switched on, current rises gradually. This rise in current through series resistor 82 increases the voltage across series resistor 82, which is V1-V2. V1 and V2 are input to unity gain current sense amplifier 62, which generates V3. The increasing current and increasing V1-V2 causes V3 to increase. V3 and V6 are input to comparator 64. Once V3 rises enough to reach V6-H, comparator 64 toggles its output V4 high, turning on feedback transistor 76 and lowering V6 to V6-L, and turning off switch 60.

Once switch 60 is turned off, the current through inductor 70 is forced through flyback diode 68 and may be stored on secondary capacitor 28. Inductor 70 resists instantaneous changes in current, so the current gradually decreases through inductor 70 when switch 60 is turned off. The decreasing current through inductor 70 also passes through series resistor 82, and the decreasing current through series resistor 82 causes V1-V2 to gradually decrease. The decreasing voltage difference V1-V2 input to unity gain current sense amplifier 62 causes V3 to slew downward. Once V3 falls below V6-L, comparator 64 toggles V4 low, turning off feedback transistor 76 and raising V6 to V6-H, and turning on switch 60. Then the cycle repeats.

Secondary current flows through secondary diode 26 to charge secondary capacitor 28 during part of the AC cycle, while secondary capacitor 28 provides current during the other parts of the AC cycle. V1 and the current through series resistor 82 thus fluctuate over the AC cycle. There may be a ripple of about 100 Hz in V1. The secondary current IS flows from V1 through series resistor 82 to V2 (VOUT) and through LED 52, illuminating LED 52. The secondary current then flows through inductor 70 and switch 60 to complete the loop back to secondary windings 14 in transformer 10.

A design goal of bang-bang controller 54 is to maintain a relatively constant current through LED 52. The upper and lower limits of V6 may be set relatively close to one another so that the change in current between upper and lower limits is relatively small. Also, the inductance of inductor 70 acts to restrict changes in the current flowing through LED 52.

Figure 6:
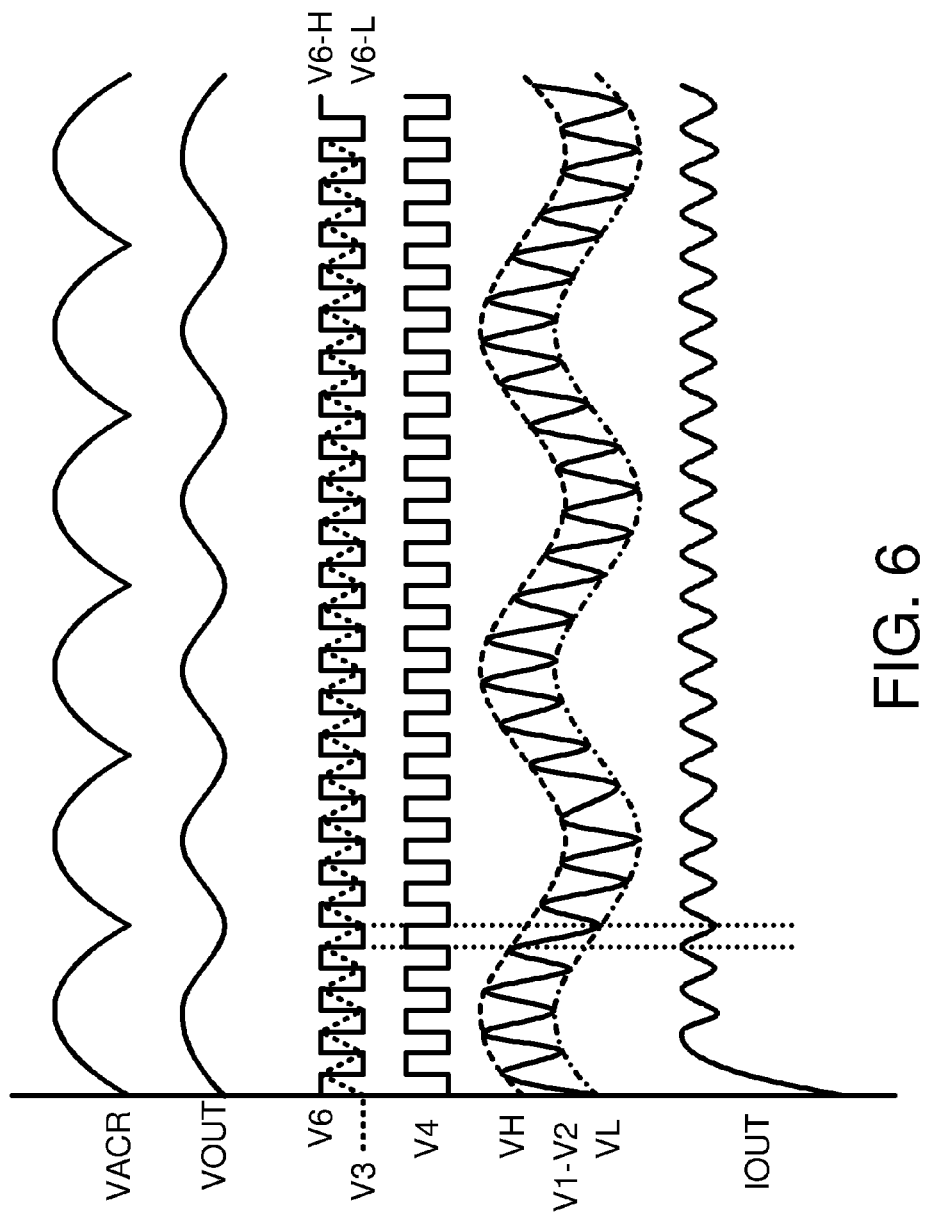
FIG. 6 shows waveforms of operation of the power converter with the bang-bang controller of FIG. 5.

FIG. 6 shows waveforms of operation of the power converter with the bang-bang controller of FIG. 5. Voltages and currents are not to scale on the Y axis. The rectified AC voltage VACR is input to the primary side of transformer 10, producing an output voltage with some variation or ripple. While the output voltage VOUT has ripple, the current TOUT through LED 52 has much less variation due to the current regulation of bang-bang controller 54.

The ripple of VOUT is about 100 Hz, which is about the frequency of VACR. However, bang-bang controller 54 toggles V4, V6, and switch 60 on and off at a much higher frequency than the ripple of VOUT. The resulting TOUT has almost no 100 Hz ripple, but only has some slight variation at the higher rate of V4, V6.

In operation, when V4 is high, V6 is at its lower limit V6-L, switch 60 is off and the LED current TOUT is decreasing, so V1-V2 falls, and V3 falls until V6-L is reached. Then V4 toggles low.

When V4 is low, V6 switches to its upper limit V6-H, switch 60 is on and the LED current TOUT is rising. V1-V2 rises, and V3 rises until V6-H is reached. Then V4 toggles high.

Thus V3 slews between V6-H and V6-L. V1-V2 is limited to between bounds VH and VL, which rise and fall with the 100 Hz ripple on V1 caused at least in part by the ripple on VACR.

Low-frequency ripple has been removed from TOUT. A fast start-up time for TOUT is also achieved. A high power factor is also obtained and safety is improved by using transformer 10 for isolation.

Alternate Embodiments

Several other embodiments are contemplated by the inventors. For example start-up circuitry could be added such as switches that pre-set nodes at initialization. While a 100 Hz ripple has been described, other frequencies of ripple could exist and be compensated for. Some countries may use 50 Hz AC power lines and thus be susceptible to 100 Hz ripple when rectified by a diode bridge, while other countries use 60 Hz AC and thus be susceptible to 120 Hz ripple. The power converter may be adjusted to accommodate other power supplies or may be designed to provide good compensation for both 50 Hz and 100 Hz power schemes. Various power sources mat be substituted. Many variations of primary-side regulation are also possible.

The upper and lower limits to the secondary voltage across secondary capacitor 28, VH and VL, are a function of V6-H and V6-L, which are set by the reference voltage VREF and the resistor values. Many possible values may be selected. Various types of reference voltages may be used, such as an external reference, a band-gap reference, or a temperature-compensated reference. Rather than have a single voltage divider with feedback transistor 76, two voltage dividers could be used to generate V6-L and V6-H, and then a mux or other selector controlled by V4 used to select either V6-L or V6-L to apply to comparator 64.

The order or sequence of components may be altered. For example, series resistor 82, LED 52, and inductor 70 are in series with each other, but they could appear in a different order. LED 52 could be placed before series resistor 82 or after inductor 70. There could be several LED's in LED 52, either in series, parallel, or some combination. Switches could be added to LED 52 to switch individual LED lamps on and off, such as for a traffic stoplight. Inverter 66 could be combined with comparator 64 and a p-channel transistor used for feedback transistor 76.

Some components may be present in a real circuit that are not shown here, such as circuitry to block glitches and prevent false triggering. Some circuitry may be eliminated or bypassed.

Secondary capacitor 28 may be a non-electrolytic capacitor such as a ceramic capacitor, or may be a low-voltage electrolytic capacitor. Since the voltage on the secondary side is stepped down by the transformer, the secondary side does not have a high voltage. Thus a high-voltage capacitor with a short lifetime is not needed for secondary capacitor 28. The capacitance value of secondary capacitor 28 may be less than 200 µF, rather than 1 mF, while the high-voltage primary capacitor has been eliminated or reduced to a smaller ceramic capacitor. Flyback diode 68 may be a standard pn diode, or may be a Zener diode.

Switches 20, 60 and feedback transistor 76 may be n-channel transistors with their substrate or bulk node connected to their sources or to a back bias voltage. These transistors may be integrated with other components or may be discrete. P-channel rather than n-channel transistors may be used for some technologies or processes, and inversions, buffers, capacitors, resistors, gates, or other components may be added to some nodes for various purposes and to tweak the converter.

While an LED load has been described, other kinds of loads may be substituted, such as for a motor, other for kinds of lighting.

Separate power supplies or grounds may be used for some components. Transformer 10 may have more than 3 windings, or another transformer may be used.

Additional filtering or control may be added, such as for dithering of pulse widths and frequencies for EMI reduction. A constant frequency and pulse width may vary by a small amount, such as 1% or 5%. To implement this dithering effect, a dithering generator may generate a small triangular voltage with triangular ripples.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A high-power-factor converter circuit comprising:
   a transformer having a primary winding and a secondary winding and an auxiliary winding that are coupled by mutual inductance;
   a primary switch that switches a primary current through the primary winding;
   a primary resistor coupled to the primary switch to sense the primary current through the primary winding;
   an auxiliary sensor coupled to sense an auxiliary current through the auxiliary winding;
   an input sensor to sense an input voltage applied to the primary winding;
   a primary controller, coupled to receive inputs from the primary resistor, the input sensor, and the auxiliary sensor, for controlling the primary switch to regulate the primary current;
   wherein a load receives a secondary current through the secondary winding;
   a secondary capacitor having an insufficient capacitance to eliminate ripple in the secondary current, the secondary capacitor coupled across the secondary winding;
   a bang-bang controller coupled to regulate the secondary current by activating a secondary switch on and off to reduce ripple of the secondary current through the load, wherein the bang-bang controller turns off the secondary switch when the secondary current reaches an upper limit, and turns on the secondary switch when the secondary current reaches a lower limit,
   wherein no high-voltage electrolytic capacitors are present on a primary side of the transformer.

2. The high-power-factor converter circuit of claim 1 wherein the bang-bang controller comprises:
   a series resistor that generates a voltage drop when the secondary current passes through the series resistor;
   an inductor connected in series with the series resistor and the load, the inductor resisting abrupt changes in the secondary current;
   a secondary switch that connects and disconnects a second terminal of the secondary winding from the secondary current passing through the load, inductor, and series resistor in response to a secondary gate signal; and
   a secondary comparator that toggles the secondary gate signal to connect and disconnect the secondary switch in response to the voltage drop exceeding an upper limit or falling below a lower limit,
   whereby ripple in the secondary current is reduced by switching the secondary current in response to comparison of the voltage drop to the upper limit and to the lower limit.

3. The high-power-factor converter circuit of claim 2 further comprising:
   a flyback diode coupled to shunt the secondary current passing through the load, inductor, and series resistor to the secondary capacitor when the secondary switch disconnects the second terminal;
   a toggling reference voltage generator that generates a toggling reference voltage that toggles between an upper reference voltage and a lower reference voltage in response to an output of the secondary comparator;
   wherein the secondary comparator receives the toggling reference voltage as an input.

4. The high-power-factor converter circuit of claim 3 further comprising:

a difference amplifier that receives a first voltage at a first terminal of the series resistor and a second voltage at a second terminal of the series resistor and generates a difference voltage that is input to the secondary comparator;

wherein the secondary comparator compares the difference voltage to the toggling reference voltage.

5. A high-power converter comprising:
a transformer having a primary winding and a secondary winding that are coupled by mutual inductance;
a primary switch that switches a primary current through the primary winding;
a primary sensor that senses the primary current through the primary winding;
a primary controller, coupled to the primary sensor and to the primary switch, for controlling the primary switch to regulate the primary current;
a secondary diode coupled between a first terminal of the secondary winding and a first node;
a secondary capacitor coupled between the first node and a second terminal of the secondary winding, the secondary capacitor having a limited capacitance that is not sufficient to eliminate low-frequency ripple from the first node;
a series resistor coupled between the first node and a second node;
an inductor coupled in series with a load between the second node and a switched node;
a secondary switch coupled to conduct a secondary current between the switched node and the second terminal of the secondary winding, the secondary switch receiving a secondary gate signal that controls the secondary switch to switch the secondary current;
a difference amplifier having inputs connected to the first node and to the second node, for generating a difference voltage;
a toggling reference generator that generates an upper reference voltage as a toggling reference voltage when the secondary switch is on, and that generates a lower reference voltage as the toggling reference voltage when the secondary switch is off; and
a secondary comparator that compares the difference voltage to the toggling reference voltage and toggles the secondary gate signal when the difference voltage reaches the toggling reference voltage;
whereby the secondary current is switched on and off as a voltage across the series resistor reaches the toggling reference voltage that toggles between upper and lower values.

6. The high-power converter of claim 5 further comprising:
a flyback diode coupled between the switched node and the first node, for shunting the secondary current when the secondary switch is switched off.

7. The high-power converter of claim 5 further comprising a high-voltage primary capacitor that is a non-electrolytic capacitor, and wherein no high-voltage electrolytic capacitor is present in the high-power converter.

8. The high-power converter of claim 7 wherein the transformer further comprises:
an auxiliary winding that is coupled to the primary winding by mutual inductance;
wherein the primary controller further comprises:
an input sensor for sensing an input voltage applied to the primary winding;
an auxiliary sensor that senses an auxiliary current through the auxiliary winding;

a multiplier for multiplying an output from the input sensor with an output from the auxiliary sensor to generate an input-auxiliary signal; and
a comparator that receives the input-auxiliary signal and an output of the primary sensor, the comparator generating a primary gate signal that controls the primary switch, the primary gate signal being applied to a gate of the primary switch.

9. The high-power converter of claim 8 wherein the toggling reference voltage generator further comprises:
a first resistor coupled between a reference voltage and the toggling reference voltage;
a second resistor coupled between the toggling reference voltage and a toggle node;
a third resistor coupled between the toggle node and the second terminal of the secondary winding;
a feedback transistor coupled between the toggle node and the second terminal of the secondary winding, the feedback transistor conducting and bypassing the third resistor in response to an output of the secondary comparator.

10. The high-power converter of claim 7 wherein the secondary current is at least one-half of an amp,
wherein the secondary capacitor has a capacitance of no more than 200 μF.

11. The high-power converter of claim 10 wherein the load comprises one or more light-emitting diodes.

12. A power converter comprising:
a transformer having a primary winding that receives an input voltage and outputs a primary current, the transformer also having a secondary winding that outputs a secondary current that is induced by mutual induction from changes in the primary current through the primary winding;
a primary-side regulator that regulates the primary current in response to variations in the input voltage;
a secondary capacitor that is of a non-electrolytic or of a low-voltage type of capacitor, the secondary capacitor having an insufficient capacitance to eliminate ripple in the secondary current, the secondary capacitor coupled across the secondary winding;
a series resistor that generates a voltage drop when the secondary current passes through the series resistor;
an inductor connected in series with the series resistor and a load, the inductor resisting abrupt changes in the secondary current;
a secondary switch that connects and disconnects a second terminal of the secondary winding from the secondary current passing through the load, inductor, and series resistor in response to a secondary gate signal; and
a secondary comparator that toggles the secondary gate signal to connect and disconnect the secondary switch in response to the voltage drop exceeding an upper limit or falling below a lower limit,
whereby ripple in the secondary current is reduced by switching the secondary current in response to comparison of the voltage drop to the upper limit and to the lower limit.

13. The power converter of claim 12 further comprising:
a flyback diode coupled to shunt the secondary current passing through the load, inductor, and series resistor to the secondary capacitor when the secondary switch disconnects the second terminal;
a secondary diode coupled to a terminal of the secondary winding, the secondary diode preventing reverse current flow in the secondary winding;
wherein the secondary capacitor is coupled across the secondary winding and the secondary diode.

14. The power converter of claim 13 further comprising:
a toggling reference voltage generator that generates a toggling reference voltage that toggles between an upper reference voltage and a lower reference voltage in response to an output of the secondary comparator;
wherein the secondary comparator receives the toggling reference voltage as an input.

15. The power converter of claim 14 further comprising:
a difference amplifier that receives a first voltage at a first terminal of the series resistor and a second voltage at a second terminal of the series resistor and generates a difference voltage that is input to the secondary comparator;
wherein the secondary comparator compares the difference voltage to the toggling reference voltage.

16. The power converter of claim 15 wherein the difference amplifier is a unity gain current sense amplifier.

17. The power converter of claim 15 wherein the toggling reference voltage generator further comprises:
a first resistor coupled between a reference voltage and the toggling reference voltage;
a second resistor coupled between the toggling reference voltage and a toggle node;
a third resistor coupled between the toggle node and the second terminal of the secondary winding; and
a feedback transistor coupled between the toggle node and the second terminal of the secondary winding, the feedback transistor conducting and bypassing the third resistor in response to the output of the secondary comparator.

18. The power converter of claim 15 wherein the primary-side regulator comprises:
a primary switch that receives the primary current from the transformer, and is controlled by a gate voltage to switch the primary current to a primary-sensing node;
a primary sensing resistor coupled to the primary-sensing node and generating a primary-sensing voltage on the primary-sensing node when the primary switch connects the primary current to the primary sensing resistor;
a primary comparator that compares the primary-sensing voltage to an error voltage to generate the gate voltage.

19. The power converter of claim 18 further comprising:
an auxiliary winding in the transformer that outputs a third current that is induced by mutual induction from changes in the primary current through the primary winding;
wherein the primary-side regulator senses the third current in comparison with the input voltage to regulate the primary current;
an auxiliary voltage divider that receives the third current and generates an auxiliary voltage;
a primary voltage divider that receives the input voltage and generates a primary divided voltage; and
a multiplier that multiplies the primary divided voltage with the auxiliary voltage to generate the error voltage to the primary comparator.

20. The power converter of claim 19 further comprising:
an error amplifier that amplifies the auxiliary voltage before being input to the multiplier.

\* \* \* \* \*